(12) United States Patent
Becker et al.

(10) Patent No.: US 12,012,881 B2
(45) Date of Patent: Jun. 18, 2024

(54) DETERMINING A SENSOR ERROR OF A SENSOR IN AN EXHAUST GAS SYSTEM OF A MOTOR VEHICLE

(71) Applicant: Bayerische Motoren Werke Aktiengesellschaft, Munich (DE)

(72) Inventors: Marius Becker, Unterfoehring (DE); Daniel Brueckner, Munich (DE); Klemens Schuerholz, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 228 days.

(21) Appl. No.: 17/597,119

(22) PCT Filed: Aug. 18, 2020

(86) PCT No.: PCT/EP2020/073058
§ 371 (c)(1),
(2) Date: Dec. 27, 2021

(87) PCT Pub. No.: WO2021/047863
PCT Pub. Date: Mar. 18, 2021

(65) Prior Publication Data
US 2022/0243636 A1    Aug. 4, 2022

(30) Foreign Application Priority Data

Sep. 10, 2019   (DE) ............... 10 2019 124 259.2

(51) Int. Cl.
| | | |
|---|---|---|
| *F01N 11/00* | (2006.01) | |
| *F02D 41/14* | (2006.01) | |
| *F02D 41/22* | (2006.01) | |

(52) U.S. Cl.
CPC ............ *F01N 11/007* (2013.01); *F01N 11/00* (2013.01); *F01N 2550/02* (2013.01)

(58) Field of Classification Search
CPC ...... F01N 11/00; F01N 11/002; F01N 11/005; F01N 11/007; F02D 41/1405; F02D 41/1495; F02D 41/222
(Continued)

(56) References Cited

U.S. PATENT DOCUMENTS

| | | | |
|---|---|---|---|
| 5,404,861 A | | 4/1995 | Wild |
| 6,092,016 A | * | 7/2000 | Sarangapani ....... F02D 41/1443 |
| | | | 123/676 |

(Continued)

FOREIGN PATENT DOCUMENTS

| | | |
|---|---|---|
| DE | 10 2005 019 017 A1 | 10/2006 |
| DE | 10 2005 032 456 A1 | 1/2007 |

(Continued)

OTHER PUBLICATIONS

International Search Report (PCT/ISA/210) issued in PCT Application No. PCT/EP2020/073058 dated Nov. 11, 2020 with English translation (six (6) pages).

(Continued)

*Primary Examiner* — Erick R Solis
(74) *Attorney, Agent, or Firm* — Crowell & Moring LLP

(57) ABSTRACT

A method determines a sensor error of a sensor in an exhaust gas system of a motor vehicle. One step of the method involves determining at least one actual sensor signal of the sensor. Another step of the method involves determining at least one target sensor signal of the sensor by means of a model. A further step of the method involves determining the sensor error of the sensor according to a deviation between the actual sensor signal of the sensor and the target sensor signal of the sensor.

8 Claims, 2 Drawing Sheets

(58) Field of Classification Search
USPC ........... 701/30.5; 73/114.71, 114.72, 114.73; 123/479, 688, 690
See application file for complete search history.

(56) References Cited

U.S. PATENT DOCUMENTS

| | | | | |
|---|---|---|---|---|
| 6,240,343 | B1* | 5/2001 | Sarangapani | G01M 15/05 |
| | | | | 73/114.61 |
| 6,609,036 | B1* | 8/2003 | Bickford | G05B 23/024 |
| | | | | 706/14 |
| 6,741,918 | B2* | 5/2004 | Kerns | F02D 41/222 |
| | | | | 701/31.3 |
| 6,917,839 | B2* | 7/2005 | Bickford | G05B 23/0275 |
| | | | | 706/14 |
| 10,991,174 | B2* | 4/2021 | Takasu | F02D 41/1459 |
| 11,053,880 | B1* | 7/2021 | Yamada | F02D 41/2441 |
| 2004/0230368 | A1* | 11/2004 | Kropinski | G05B 9/02 |
| | | | | 701/114 |
| 2007/0028678 | A1 | 2/2007 | Schnaibel et al. | |
| 2009/0178388 | A1 | 7/2009 | Schumacher et al. | |
| 2010/0131181 | A1* | 5/2010 | Herrmann | F02M 26/24 |
| | | | | 60/276 |
| 2014/0229089 | A1 | 8/2014 | Jankovic et al. | |
| 2014/0325960 | A1 | 11/2014 | Mahaveera et al. | |
| 2016/0246295 | A1 | 8/2016 | Pieta et al. | |
| 2020/0294472 | A1* | 9/2020 | Jones | G02B 27/0172 |
| 2023/0288888 | A1* | 9/2023 | Fiebiger | G05B 15/02 |
| | | | | 700/282 |

FOREIGN PATENT DOCUMENTS

| | | |
|---|---|---|
| DE | 10 2008 004 221 A1 | 7/2009 |
| DE | 10 2013 214 541 A1 | 2/2014 |
| DE | 10 2014 202 101 A1 | 8/2014 |
| EP | 3623610 A1 * 3/2020 ......... F02D 41/1405 |
| WO | WO 93/16277 A1 | 8/1993 |
| WO | WO 2013/045522 A1 | 4/2013 |

OTHER PUBLICATIONS

German-language Written Opinion (PCT/ISA/237) issued in PCT Application No. PCT/EP2020/073058 dated Nov. 11, 2020 (seven (7) pages).

German-language Search Report issued in German Application No. 10 2019 124 259.2 dated Oct. 14, 2021 with partial English translation (11 pages).

* cited by examiner

DETERMINING A SENSOR ERROR OF A SENSOR IN AN EXHAUST GAS SYSTEM OF A MOTOR VEHICLE

BACKGROUND AND SUMMARY OF THE INVENTION

The invention relates to a method and a device for identifying a sensor fault of a sensor in an exhaust-gas system of a motor vehicle.

It is known to identify sensor faults of sensors, for example lambda probes, in the exhaust-gas system of a motor vehicle by actuating the internal combustion engine that is situated upstream of the exhaust-gas system in a predetermined manner such that, for a fault-free sensor, a likewise predetermined sensor signal is generated as a result. If the actual sensor signal deviates from the predetermined sensor signal, then it is concluded that a sensor fault is present.

The known approaches for identifying a sensor fault of a sensor in an exhaust-gas system of a motor vehicle have the disadvantage that, in these, the internal combustion engine situated upstream of the exhaust-gas system must be actively actuated, which leads to adverse effects on driving comfort and/or to the generation of undesired emissions.

It is the object of the invention to at least alleviate the stated disadvantages.

The object is achieved by means of the features of the independent patent claims. Advantageous embodiments are described in the dependent claims. It is pointed out that additional features of a patent claim that is dependent on an independent patent claim can, without the features of the independent patent claim or only in combination with a subset of the features of the independent patent claim, form a separate invention which is independent of the combination of all of the features of the independent patent claim and which may be made the subject of an independent claim, of a divisional application or of a subsequent application. This applies equally to technical teachings described in the description, which can form an invention that is independent of the features of the independent patent claims.

A first aspect of the invention relates to a method for identifying a sensor fault of a sensor for an exhaust-gas system of a motor vehicle.

The sensor is in particular mounted within the exhaust-gas system, for example upstream or downstream of a catalytic converter in relation to an exhaust-gas flow.

One step of the method is determining at least one actual sensor signal of the sensor. The actual sensor signal of the sensor is the signal which is generated by the sensor and by way of which the sensor makes available the physical or chemical characteristics of its surroundings, as measured by the sensor.

A further step of the method is determining at least one setpoint sensor signal of the sensor by means of a model.

The setpoint sensor signal of the sensor is a virtual signal generated by the sensor. The setpoint sensor signal indicates, in a manner dependent on the ambient conditions around the sensor, the actual sensor signal that a fault-free sensor would generate.

The setpoint sensor signal may in particular be generated by an artificial neural network.

A neural network is a collection of individual information processing units (neurons) that are arranged in layered fashion in a network architecture. In the context of artificial intelligence, the term "artificial neural networks" is used.

The neurons of an artificial neural network are arranged in layered fashion in so-called layers and are generally connected to one another in a fixed hierarchy. Here, the neurons are normally connected between two layers, but also in rarer cases within one layer.

Starting at the input layer, information flows via one or more intermediate layers (hidden layer) to the output layer. Here, the output of one neuron is the input of the next.

The input layer is the starting point of the information flow in an artificial neural network.

Input signals are normally received by the neurons at the start of this layer and, at the end, are transmitted with a weighting to the neurons of the first intermediate layer. Here, a neuron of the input layer transmits the respective information to the neurons of the first intermediate layer.

In any artificial neural network, at least one intermediate layer (also referred to as activity layer or hidden layer) is situated between the input layer and the output layer. The more intermediate layers are present, the "deeper" the neural network; in such cases, the term "deep learning" is also used.

In theory, the number of possible hidden layers in an artificial neural network is unlimited. In practice, however, every additional hidden layer also results in an increase in the processing power required to operate the network.

The output layer follows the intermediate layers and forms the final layer in an artificial neural network. Neurons arranged in the output layer are each connected to the neurons of the final intermediate layer. The output layer constitutes the end point of the information flow in an artificial neural network and contains the result of the information processing by the network.

Weights describe the intensity of the information flow along a connection in a neural network. For this purpose, each neuron assigns a weight to the information flowing through and then transmits the information with the weighting, and possibly after the addition of a value for the neuron-specific bias, to the neurons of the next layer. The weights and biases are normally initialized at the start of the training process. The result of the weighting and biasing is often passed through a so-called activation function before being transmitted to the neurons of the next layer.

The weights and biases are adapted during the training process such that the end result corresponds as exactly as possible to the requirements.

A further step of the method is the identifying of the sensor fault of the sensor in a manner dependent on a deviation between the actual sensor signal of the sensor and the setpoint sensor signal of the sensor.

An advantage of the invention is that no active actuation of the internal combustion engine situated upstream of the exhaust-gas system is necessary in order to identify the sensor fault of the sensor.

In one advantageous embodiment of the invention, the identifying of the deviation between the actual sensor signal of the sensor and the setpoint sensor signal of the sensor comprises providing at least one fault model for the actual sensor signal of the sensor, determining at least one fault sensor signal of the sensor by linking the setpoint sensor signal of the sensor with the, in each case, one fault model, and identifying the sensor fault of the sensor in a manner dependent on at least one deviation between the actual sensor signal of the sensor and in each case one fault sensor signal of the sensor.

The fault model is in particular a classification of a sensor fault that leads to systematic deviations in the actual sensor signal.

In a further advantageous embodiment, the at least one fault model is a parameterizable fault model which has at least one parameter. Here, the identifying of the at least one deviation between the actual sensor signal of the sensor and in each case one fault sensor signal of the sensor comprises estimating the at least one parameter of the fault model such that the deviation between the actual sensor signal of the sensor and in each case one fault sensor signal of the sensor is minimized, and identifying the sensor fault in a manner dependent on the at least one parameter of the fault model. For example, the estimated parameter of the fault model may be identified as a sensor fault, such that the sensor fault is not only qualitatively determined as being present but is moreover quantified.

In a further advantageous embodiment, the method comprises providing at least two fault models for the actual sensor signal of the sensor.

Furthermore, in this advantageous embodiment, the method comprises determining at least two fault sensor signals of the sensor by linking the setpoint sensor signal of the sensor with in each case one fault model, and identifying the deviation between the actual sensor signal of the sensor and in each case one fault sensor signal of the sensor.

Additionally, in this advantageous embodiment, the method comprises selecting one of the fault models in a manner dependent on the identified deviations between the actual sensor signal of the sensor and the respective fault sensor signal of the sensor, and identifying the sensor fault in a manner dependent on the selected fault model.

This advantageous embodiment is based on the recognition that it can be advantageous to compare the actual sensor signal of the sensor with multiple fault sensor signals, because a sensor may be affected by different fault models. It is thus possible, for example, for the fault model that is most likely present to be determined during operation without active actuation of the internal combustion engine situated upstream of the exhaust-gas system.

In a further advantageous embodiment, the at least one fault model comprises at least one of the following six fault models.

1. Time delay of the actual sensor signal relative to the setpoint sensor signal in the event of a change of the combustion air ratio from a rich mixture to a lean mixture, and no time delay of the actual sensor signal relative to the setpoint sensor signal in the event of a change of the combustion air ratio from a lean mixture to a rich mixture. Here, a rich mixture is characterized by a "deficiency of air" with a lambda value less than 1. By contrast, a lean mixture is characterized by an "excess of air" with a lambda value greater than 1.
2. Time delay of the actual sensor signal relative to the setpoint sensor signal in the event of a change of the combustion air ratio from a lean mixture to a rich mixture, and no time delay of the actual sensor signal relative to the setpoint sensor signal in the event of a change of the combustion air ratio from a rich mixture to a lean mixture.
3. Low-pass filtering of the actual sensor signal relative to the setpoint sensor signal in the event of a change of the combustion air ratio from a rich mixture to a lean mixture, and no low-pass filtering of the actual sensor signal relative to the setpoint sensor signal (SSS) in the event of a change of the combustion air ratio from a lean mixture to a rich mixture.
4. Low-pass filtering of the actual sensor signal relative to the setpoint sensor signal in the event of a change of the combustion air ratio from a lean mixture to a rich mixture, and no low-pass filtering of the actual sensor signal relative to the setpoint sensor signal in the event of a change of the combustion air ratio from a rich mixture to a lean mixture.
5. Time delay of the actual sensor signal relative to the setpoint sensor signal in the event of a change of the combustion air ratio from a lean mixture to a rich mixture, and time delay of the actual sensor signal relative to the setpoint sensor signal in the event of a change of the combustion air ratio from a rich mixture to a lean mixture.
6. Low-pass filtering of the actual sensor signal relative to the setpoint sensor signal in the event of a change of the combustion air ratio from a lean mixture to a rich mixture, and low-pass filtering of the actual sensor signal relative to the setpoint sensor signal in the event of a change of the combustion air ratio from a rich mixture to a lean mixture.

In a further advantageous embodiment of the invention, the sensor is a lambda probe that is in particular arranged in the exhaust-gas system upstream of a catalytic converter in relation to an exhaust-gas flow.

In a further advantageous embodiment of the invention, the model for determining the at least one setpoint sensor signal of the sensor is a neural network.

In a further advantageous embodiment of the invention, the sensor is a lambda probe that is arranged in the exhaust-gas system downstream of a catalytic converter in relation to an exhaust-gas flow.

Additionally, in this advantageous embodiment, the method comprises determining at least one actual sensor signal of the sensor, and determining at least two setpoint sensor signals of the sensor by means of in each case one model, wherein each model is characteristic of a specific state of aging of the catalytic converter.

Furthermore, in this advantageous embodiment, the method comprises identifying in each case one deviation between the actual sensor signal of the sensor and one of the setpoint sensor signals of the sensor, and selecting one of the setpoint sensor signals of the sensor in a manner dependent on the identified deviations, and identifying the sensor fault in a manner dependent on a deviation between the actual sensor signal of the sensor and the selected setpoint sensor signal of the sensor.

A second aspect of the invention relates to a device for identifying a sensor fault of a sensor in an exhaust-gas section of a motor vehicle, wherein the device is configured to determine at least one actual sensor signal of the sensor, to determine at least one setpoint sensor signal of the sensor by means of a model, and to identify the sensor fault of the sensor in a manner dependent on a deviation between the actual sensor signal of the sensor and the setpoint sensor signal of the sensor.

The above statements relating to the method according to the invention according to the first aspect of the invention also apply correspondingly to the device according to the invention according to the second aspect of the invention. Advantageous exemplary embodiments of the device according to the invention that are not explicitly described here and in the patent claims correspond to the advantageous exemplary embodiments of the method according to the invention described above or described in the patent claims.

The invention will be described below on the basis of an exemplary embodiment with reference to the appended drawings.

DETAILED DESCRIPTION OF THE DRAWINGS

Figure 1:
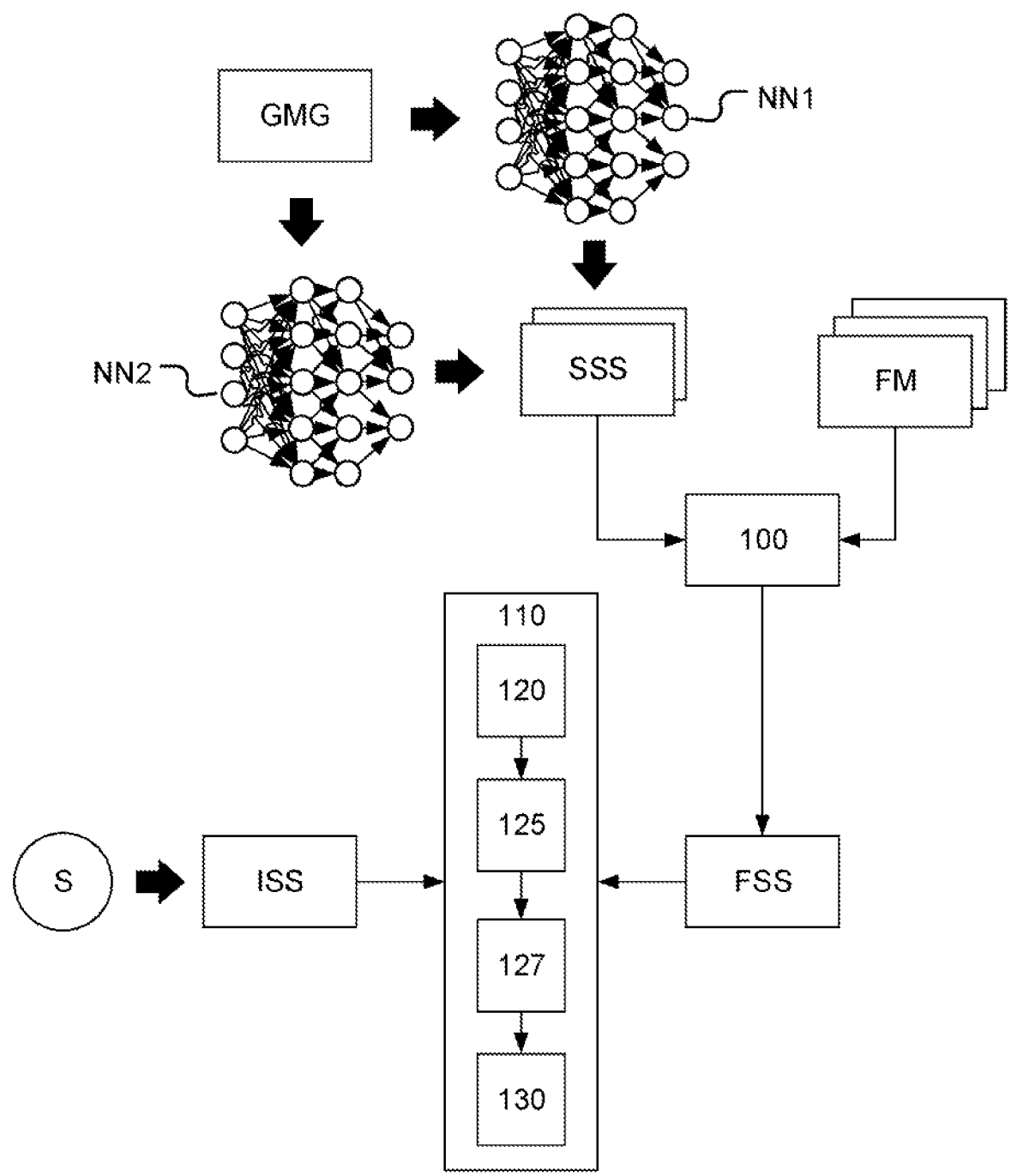
FIG. 1 shows an exemplary embodiment of the method according to the invention.

FIG. 1 shows a method for identifying a sensor fault of a sensor for an exhaust-gas system of a motor vehicle.

One step of the method is determining at least one actual sensor signal ISS of the sensor S, in particular by means of the sensor S itself.

A further step of the method is determining at least one setpoint sensor signal SSS of the sensor S by means of a model NN1, NN2, in particular in a manner dependent on at least one underlying-engine variable GMG. The at least one underlying-engine variable GMG is in particular an actuating variable or characteristic variable of the underlying engine, for example an actuating variable or characteristic variable of a crankshaft or flywheel casing, crankshaft or camshaft, drive wheels, cylinder head or cylinder head cover, connecting rod, piston, oil cooler, oil separator, oil filter and/or injection system.

The model NN1, NN2 for determining the at least one setpoint sensor signal SSS of the sensor S is in particular a neural network.

A further step of the method is identifying 110 the sensor fault of the sensor S in a manner dependent on a deviation between the actual sensor signal ISS of the sensor S and the setpoint sensor signal SSS of the sensor S.

It is possible in particular for the deviation between the actual sensor signal ISS of the sensor and the setpoint sensor signal SSS of the sensor to be identified, wherein the identifying of the deviation between the actual sensor signal ISS of the sensor S and the setpoint sensor signal SSS of the sensor S comprises providing at least one fault model FM for the actual sensor signal ISS of the sensor S. The at least one fault model FM is in particular a parameterizable fault model and thus has at least one parameter.

Furthermore, the identifying of the deviation between the actual sensor signal ISS of the sensor S and the setpoint sensor signal SSS of the sensor S comprises determining 100 at least one fault sensor signal FSS of the sensor S by linking the setpoint sensor signal SSS of the sensor S with the in each case one fault model FM, and identifying 110 the sensor fault of the sensor S in a manner dependent on at least one deviation between the actual sensor signal ISS of the sensor S and in each case one fault sensor signal FSS of the sensor S.

The identifying 110 of the at least one deviation between the actual sensor signal ISS of the sensor S and in each case one fault sensor signal FSS of the sensor S comprises in particular estimating 120 the at least one parameter of the fault model FM such that the deviation between the actual sensor signal ISS of the sensor S and in each case one fault sensor signal FSS of the sensor S is minimized.

For this purpose, use may for example be made of a conventional curve fitting method, that is to say a mathematical optimization method with the aid of which, for a series of measurement data, the unknown parameters of the geometrical-physical model thereof, or the parameters of a specified function, are to be determined or estimated, for example the least squares method.

The identifying 110 of the at least one deviation between the actual sensor signal ISS of the sensor S and in each case one fault sensor signal FSS of the sensor S in particular additionally comprises identifying 130 the sensor fault in a manner dependent on at least one parameter of the fault model FM.

Alternatively, the method comprises providing at least two fault models FM for the actual sensor signal ISS of the sensor S.

In this case, the method comprises determining 100 at least two fault sensor signals FSS of the sensor S by linking the setpoint sensor signal SSS of the sensor S with in each case one fault model FM, identifying 110 the deviation between the actual sensor signal ISS of the sensor S and in each case one fault sensor signal FSS of the sensor S, selecting 125 one of the fault models FM in a manner dependent on the identified deviations between the actual sensor signal ISS of the sensor S and the respective fault sensor signal FSS of the sensor S, and identifying 130 the sensor fault in a manner dependent on the selected fault model FM.

The sensor S is in particular a lambda probe in the exhaust-gas system of the motor vehicle. For example, the sensor S is a lambda probe that is arranged in the exhaust-gas system upstream of a catalytic converter in relation to an exhaust-gas flow.

Alternatively, the sensor S is a lambda probe that is arranged in the exhaust-gas system downstream of the catalytic converter in relation to an exhaust-gas flow.

In this case, the method additionally comprises, for example, determining at least two setpoint sensor signals SSS of the sensor S by means of in each case one model NN1, NN2, wherein each model NN1, NN2 is characteristic of a specific state of aging of the catalytic converter.

One step of the method is in this case identifying 110 in each case one deviation between the actual sensor signal ISS of the sensor S and one of the setpoint sensor signals SSS of the sensor S.

A further step of the method is selecting 127 one of the setpoint sensor signals SSS of the sensor S in a manner dependent on the identified deviations. In particular, it is possible for this purpose, too, for a minimum, that is to say smallest, deviation to be determined using the curve fitting method, and for that sensor signal SSS of the sensor S which has the minimum deviation to then be selected.

Furthermore, in this case, the method comprises the step of identifying 130 the sensor fault in a manner dependent on a deviation between the actual sensor signal ISS of the sensor S and the selected setpoint sensor signal SSS of the sensor S.

Figure 2:
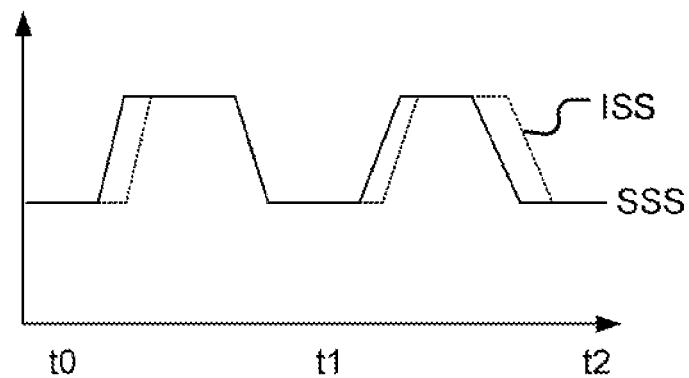
FIG. 2 shows exemplary embodiments of fault models.

FIG. 2 shows exemplary embodiments of fault models of a lambda probe, with profiles of a setpoint sensor signal SSS and of an actual sensor signal ISS being plotted versus the time. Here, the setpoint sensor signal SSS is depicted as a solid line. Deviations of the actual sensor signal ISS from the setpoint sensor signal SSS are illustrated by dotted lines. In order to simplify the illustration, for time segments in which the actual sensor signal ISS substantially corresponds to the setpoint sensor signal SSS, no separate line is shown for the actual sensor signal ISS.

Between the time t0 and the time t1, the actual sensor signal ISS relative to the setpoint sensor signal SSS shows the fault model of a time delay of the actual sensor signal ISS relative to the setpoint sensor signal SSS in the event of a change of the combustion air ratio from a rich mixture to a lean mixture and no time delay of the actual sensor signal ISS relative to the setpoint sensor signal SSS in the event of a change of the combustion air ratio from a lean mixture to a rich mixture.

Between the time t1 and the time t2, the actual sensor signal ISS relative to the setpoint sensor signal SSS shows the fault model of a time delay of the actual sensor signal ISS relative to the setpoint sensor signal SSS in the event of a change of the combustion air ratio from a lean mixture to a rich mixture and a time delay of the actual sensor signal ISS relative to the setpoint sensor signal SSS in the event of a change of the combustion air ratio from a rich mixture to a lean mixture.

Figure 3:
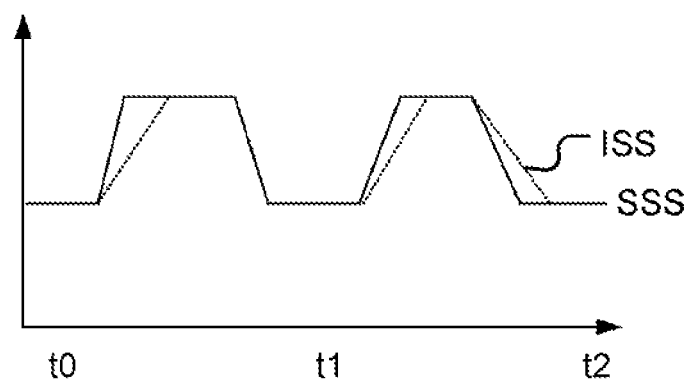
FIG. 3 shows further exemplary embodiments of fault models.

FIG. 3 shows further exemplary embodiments of fault models of a lambda probe in the same illustration as FIG. 2.

Between the time t0 and the time t1, the actual sensor signal ISS relative to the setpoint sensor signal SSS shows the fault model of low-pass filtering of the actual sensor signal ISS relative to the setpoint sensor signal SSS in the event of a change of the combustion air ratio from a rich mixture to a lean mixture and no low-pass filtering of the actual sensor signal ISS relative to the setpoint sensor signal SSS in the event of a change of the combustion air ratio from a lean mixture to a rich mixture.

Between the time t1 and the time t2, the actual sensor signal ISS relative to the setpoint sensor signal SSS shows the fault model of low-pass filtering of the actual sensor signal ISS relative to the setpoint sensor signal SSS in the event of a change of the combustion air ratio from a lean mixture to a rich mixture and low-pass filtering of the actual sensor signal ISS relative to the setpoint sensor signal SSS in the event of a change of the combustion air ratio from a rich mixture to a lean mixture.

What is claimed is:

1. A method for identifying a sensor fault of a sensor for an exhaust-gas system of a motor vehicle, the method comprising the steps of:
   determining at least one actual sensor signal of the sensor;
   determining at least one setpoint sensor signal of the sensor by way of at least one fault model; and
   identifying the sensor fault of the sensor in a manner dependent on a deviation between the actual sensor signal of the sensor and the setpoint sensor signal of the sensor, wherein the at least one fault model comprises at least one of the following fault models:
   (i) time delay of the actual sensor signal relative to the setpoint sensor signal in the event of a change of the combustion air ratio from a rich mixture to a lean mixture, and no time delay of the actual sensor signal relative to the setpoint sensor signal in the event of a change of the combustion air ratio from a lean mixture to a rich mixture,
   (ii) time delay of the actual sensor signal relative to the setpoint sensor signal in the event of a change of the combustion air ratio from a lean mixture to a rich mixture, and no time delay of the actual sensor signal relative to the setpoint sensor signal in the event of a change of the combustion air ratio from a rich mixture to a lean mixture,
   (iii) low-pass filtering of the actual sensor signal relative to the setpoint sensor signal in the event of a change of the combustion air ratio from a rich mixture to a lean mixture, and no low-pass filtering of the actual sensor signal relative to the setpoint sensor signal in the event of a change of the combustion air ratio from a lean mixture to a rich mixture,
   (iv) low-pass filtering of the actual sensor signal relative to the setpoint sensor signal in the event of a change of the combustion air ratio from a lean mixture to a rich mixture, and no low-pass filtering of the actual sensor signal relative to the setpoint sensor signal in the event of a change of the combustion air ratio from a rich mixture to a lean mixture,
   (v) time delay of the actual sensor signal relative to the setpoint sensor signal in the event of a change of the combustion air ratio from a lean mixture to a rich mixture, and time delay of the actual sensor signal relative to the setpoint sensor signal in the event of a change of the combustion air ratio from a rich mixture to a lean mixture, or
   (vi) low-pass filtering of the actual sensor signal relative to the setpoint sensor signal in the event of a change of the combustion air ratio from a lean mixture to a rich mixture, and low-pass filtering of the actual sensor signal relative to the setpoint sensor signal in the event of a change of the combustion air ratio from a rich mixture to a lean mixture.

2. The method according to claim 1, wherein identifying the deviation between the actual sensor signal of the sensor and the setpoint sensor signal of the sensor comprises the steps of:
   determining at least one fault sensor signal of the sensor by linking the setpoint sensor signal of the sensor with the at least one fault model; and
   identifying the sensor fault of the sensor in a manner dependent on at least one deviation between the actual sensor signal of the sensor and in each case one fault sensor signal of the sensor.

3. The method according to claim 2, wherein
   the at least one fault model is a parameterizable fault model and has at least one parameter, and
   the identifying of the at least one deviation between the actual sensor signal of the sensor and in each case one fault sensor signal of the sensor comprises the steps of:
      estimating the at least one parameter of the fault model such that the deviation between the actual sensor signal of the sensor and in each case one fault sensor signal of the sensor is minimized; and
      identifying the sensor fault in a manner dependent on at least one parameter of the fault model.

4. The method according to claim 2, the method further comprising the steps of:
   providing at least two fault models for the actual sensor signal of the sensor;
   determining at least two fault sensor signals of the sensor by linking the setpoint sensor signal of the sensor with in each case one fault model;
   identifying the deviation between the actual sensor signal of the sensor and in each case one fault sensor signal of the sensor;
   selecting one of the fault models in a manner dependent on the identified deviations between the actual sensor signal of the sensor and the respective fault sensor signal of the sensor; and
   identifying the sensor fault in a manner dependent on the selected fault model.

5. The method according to claim 1, wherein
   the sensor is a lambda probe arranged in the exhaust-gas system upstream of a catalytic converter in relation to an exhaust-gas flow.

6. The method according to claim 1, wherein
   the model for determining the at least one setpoint sensor signal of the sensor is a neural network.

7. The method according to claim 1, wherein the sensor is a lambda probe arranged in the exhaust-gas system downstream of a catalytic converter in relation to an exhaust-gas flow, wherein the method comprises the steps of:

determining at least one actual sensor signal of the sensor,
determining at least two setpoint sensor signals of the sensor by way of in each case one model, wherein each model is characteristic of a specific state of aging of the catalytic converter;
identifying in each case one deviation between the actual sensor signal of the sensor and one of the setpoint sensor signals of the sensor;
selecting one of the setpoint sensor signals of the sensor in a manner dependent on the identified deviations; and
identifying the sensor fault in a manner dependent on a deviation between the actual sensor signal of the sensor and the selected setpoint sensor signal of the sensor.

8. A device for identifying a sensor fault of a sensor in an exhaust-gas system of a motor vehicle, comprising:
a processor and associated memory configured to:
receive at least one actual sensor signal of the sensor,
determine at least one setpoint sensor signal of the sensor by way of at least one fault model, and
identify the sensor fault of the sensor in a manner dependent on a deviation between the actual sensor signal of the sensor and the setpoint sensor signal of the sensor, wherein the at least one fault model comprises at least one of the following fault models:
(i) time delay of the actual sensor signal relative to the setpoint sensor signal in the event of a change of the combustion air ratio from a rich mixture to a lean mixture, and no time delay of the actual sensor signal relative to the setpoint sensor signal in the event of a change of the combustion air ratio from a lean mixture to a rich mixture,
(ii) time delay of the actual sensor signal relative to the setpoint sensor signal in the event of a change of the combustion air ratio from a lean mixture to a rich mixture, and no time delay of the actual sensor signal relative to the setpoint sensor signal in the event of a change of the combustion air ratio from a rich mixture to a lean mixture,
(iii) low-pass filtering of the actual sensor signal relative to the setpoint sensor signal in the event of a change of the combustion air ratio from a rich mixture to a lean mixture, and no low-pass filtering of the actual sensor signal relative to the setpoint sensor signal in the event of a change of the combustion air ratio from a lean mixture to a rich mixture,
(iv) low-pass filtering of the actual sensor signal relative to the setpoint sensor signal in the event of a change of the combustion air ratio from a lean mixture to a rich mixture, and no low-pass filtering of the actual sensor signal relative to the setpoint sensor signal in the event of a change of the combustion air ratio from a rich mixture to a lean mixture,
(v) time delay of the actual sensor signal relative to the setpoint sensor signal in the event of a change of the combustion air ratio from a lean mixture to a rich mixture, and time delay of the actual sensor signal relative to the setpoint sensor signal in the event of a change of the combustion air ratio from a rich mixture to a lean mixture, or
(vi) low-pass filtering of the actual sensor signal relative to the setpoint sensor signal in the event of a change of the combustion air ratio from a lean mixture to a rich mixture, and low-pass filtering of the actual sensor signal relative to the setpoint sensor signal in the event of a change of the combustion air ratio from a rich mixture to a lean mixture.

* * * * *